Figure 5:
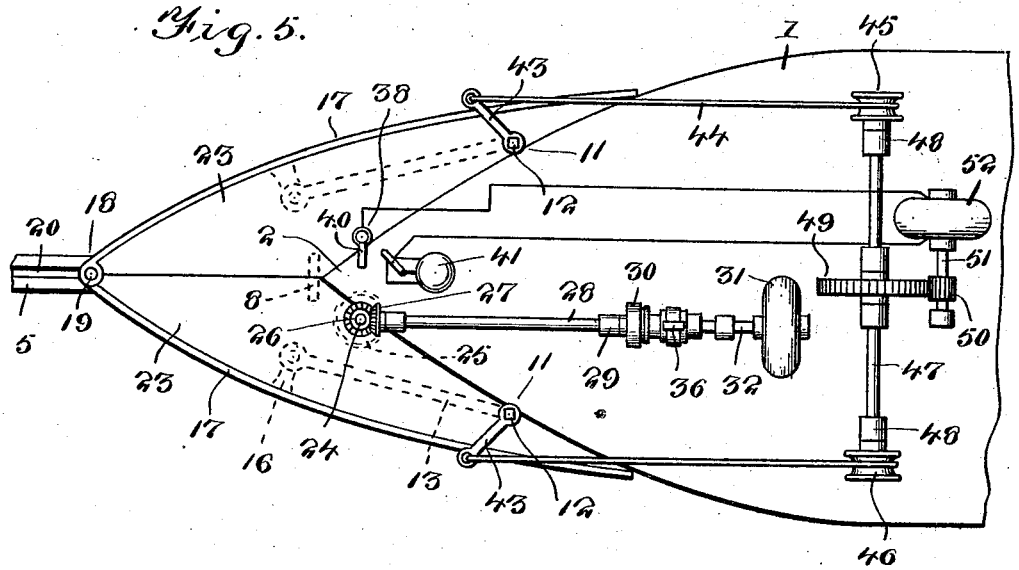

V. GRECO.
EMERGENCY BRAKE FOR SHIPS.
APPLICATION FILED APR. 10, 1915.
1,188,269.
Patented June 20, 1916.
5 SHEETS—SHEET 1.
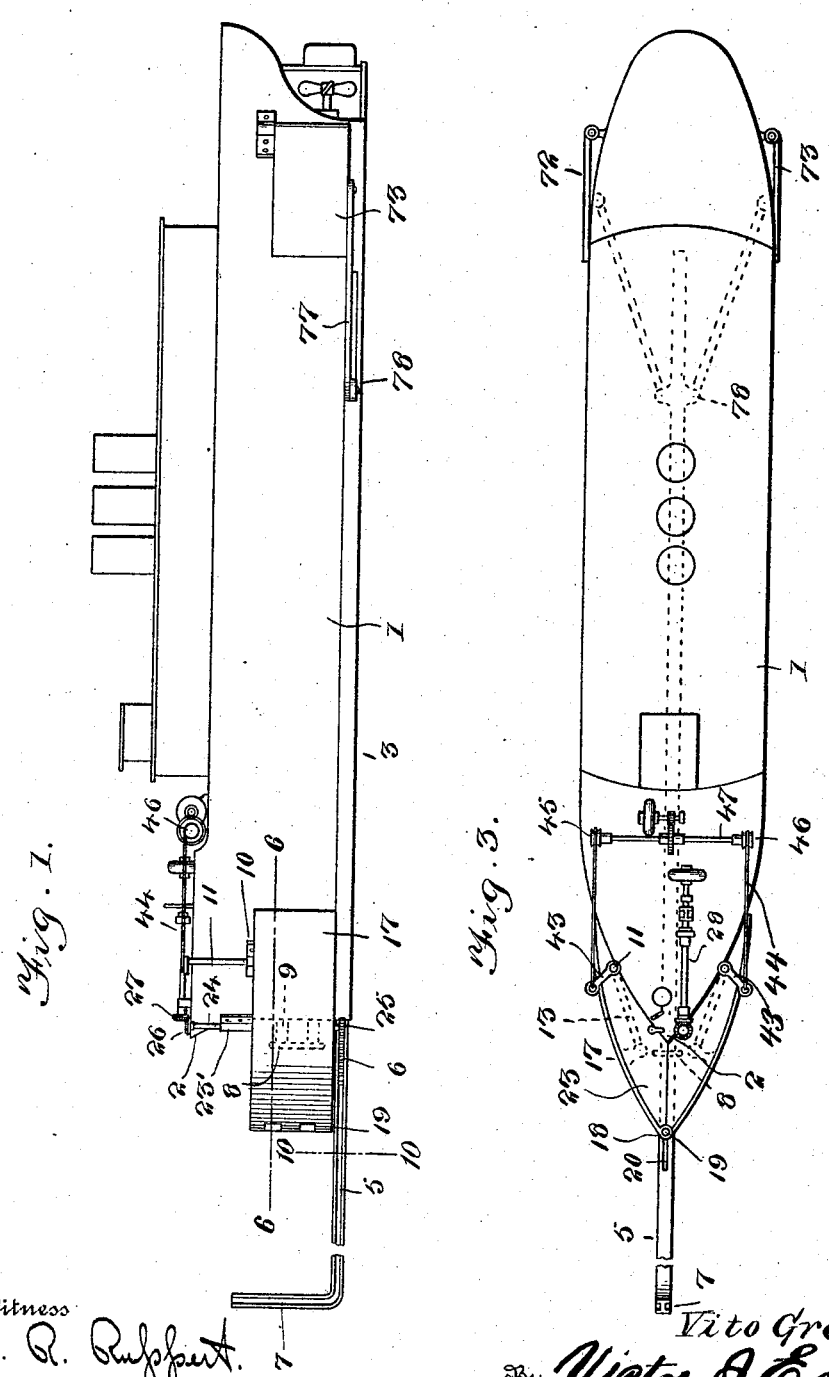

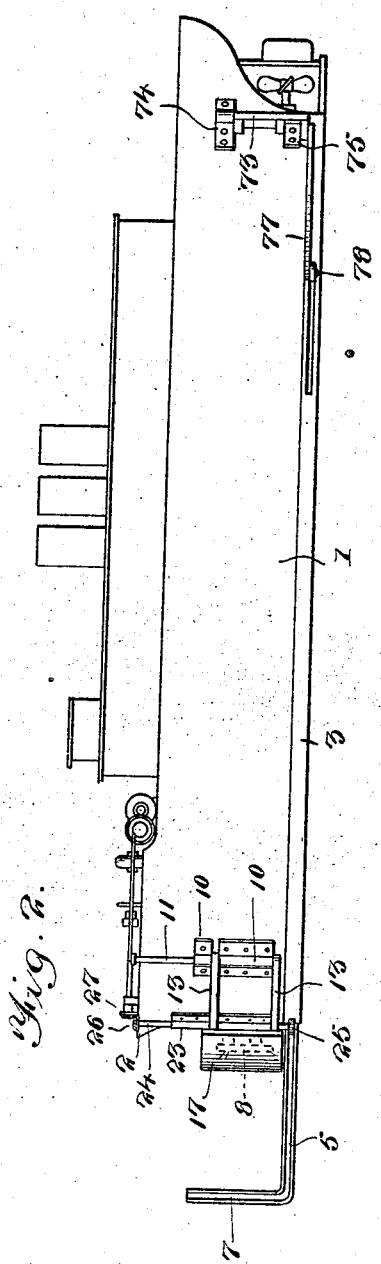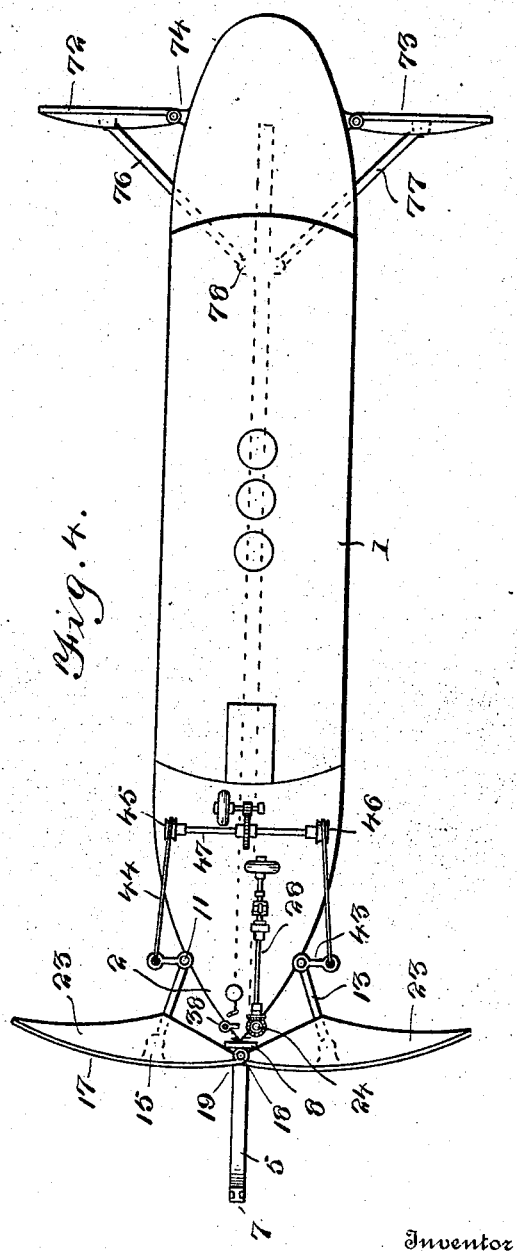

V. GRECO.
EMERGENCY BRAKE FOR SHIPS.
APPLICATION FILED APR. 10, 1915.

1,188,269.

Patented June 20, 1916.
5 SHEETS—SHEET 3.

Witness:
E. R. Ruppert.

Inventor
Vito Greco
By Victor J. Evans
Attorney

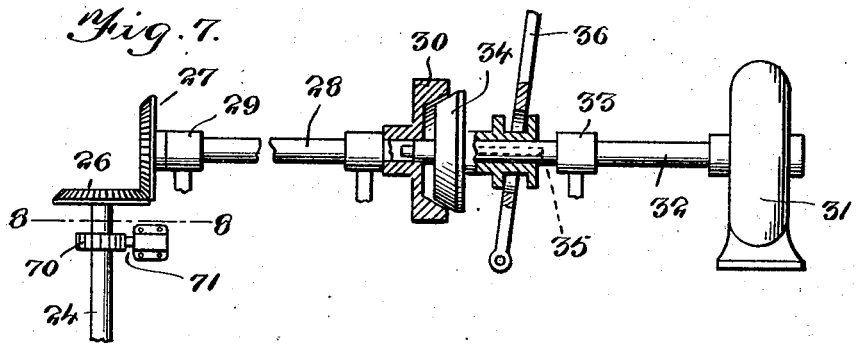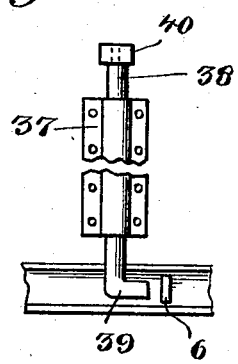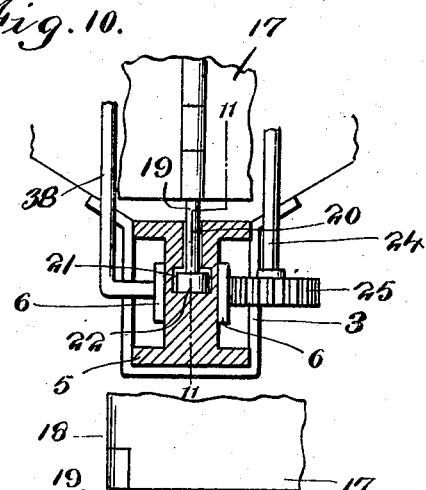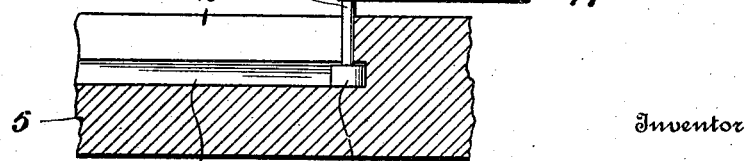

V. GRECO.
EMERGENCY BRAKE FOR SHIPS.
APPLICATION FILED APR. 10, 1915.
1,188,269.
Patented June 20, 1916.
5 SHEETS—SHEET 5.
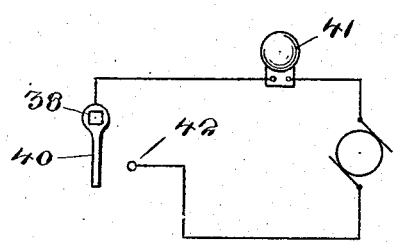
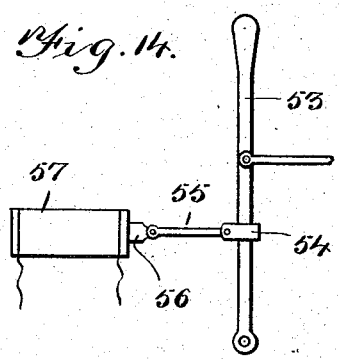
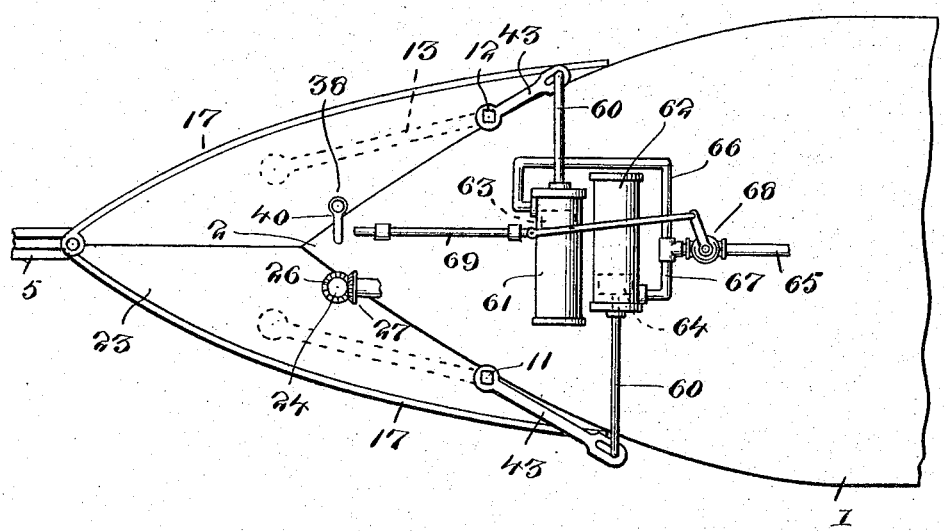
Inventor
Vito Greco
Witness
E. R. Ruppert
By Victor J. Evans
Attorney

UNITED STATES PATENT OFFICE.

VITO GRECO, OF WATERLOO, IOWA, ASSIGNOR OF ONE-HALF TO ANTONIO CALABRESE, OF WATERLOO, IOWA.

EMERGENCY-BRAKE FOR SHIPS.

1,188,269.      Specification of Letters Patent.      Patented June 20, 1916.

Application filed April 10, 1915. Serial No. 20,489.

*To all whom it may concern:*

Be it known that I, VITO GRECO, a citizen of Italy, residing at Waterloo, in the county of Blackhawk and State of Iowa, have invented new and useful Improvements in Emergency-Brakes for Ships, of which the following is a specification.

The present invention relates to emergency brakes for marine vessels, the primary object of the invention being to provide a vessel with means whereby a brake will be instantly applied when an obstruction is contacted by a contact member associated with the vessel; an alarm is sounded to warn the officers and if necessary the passengers of the vessel; and the engine is stopped and reversed so that the vessel will be propelled away from the obstruction and the danger resulting from a collision thus obviated.

A further object of the invention is to arrange in the keel of a marine vessel a longitudinally movable bar having a nose arranged upon the outer end thereof, means being provided for projecting the bar a suitable and desired distance beyond the vessel, and whereby the nose of the bar contacting with an obstruction will sound an alarm or otherwise warn the officers of the vessel that the said vessel is in danger of a collision or contact.

A still further object of the invention is to provide a marine vessel with wings which serve as brakes and which are normally folded against the vessel but which are provided with means disposed forward of the wings for operating the same to swing the said wings outward of the vessel when the said means is contacted so that the wings will serve as an effective brake for halting the movement of the vessel.

A still further object of the invention is to provide the stem of a marine vessel with a movable member which serves as a buffer for the winged brakes attached to the vessel, whereby, should the vessel come in contact with an obstruction the shock therefrom will be partially absorbed by the buffer.

With the above and other objects in view, the improvement resides in the construction, combination and arrangement of parts set forth in the following specification and falling within the scope of the appended claims.

Figure 6:
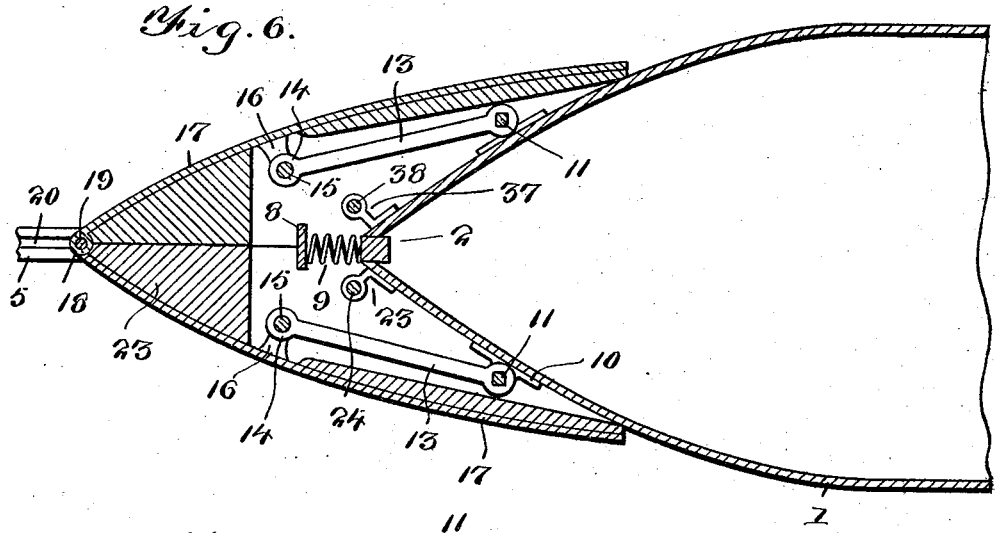
Figure 12:

In the drawings: Figure 1 is a side elevation of a vessel provided with my improvement showing the wings folded against the bow of the same, Fig. 2 is a similar view showing the wings spread to act as brakes for halting the movement of the vessel, Fig. 3 is a top plan view showing the device illustrated in Fig. 1, Fig. 4 is a similar view showing the device as illustrated in Fig. 2, Fig. 5 is an enlarged plan view of the bow of the vessel, showing the wiring for the electric connection, Fig. 6 is an enlarged detail horizontal sectional view approximately on the line 6—6 of Fig. 1, Fig. 7 is an elevation, partly in section and with parts broken away illustrating the clutch arrangement on the motor shaft, and the engagement of the toothed wheel of the vertical shaft with the teeth on one side of the movable bar or feeler member, Fig. 8 is a sectional view approximately on the line 8—8 of Fig. 7, Fig. 9 is a detail elevation illustrating the arrangement of the finger of the shaft 38 with relation to the tooth 6 of the bar or feeler, Fig. 10 is a detail sectional view approximately on the line 10—10 of Fig. 2, Fig. 11 is a detail sectional view approximately on the line 11—11 of Fig. 10, Fig. 12 is a sectional view through one of the shafts 11 in a line with the ratchet wheel secured thereon, Fig. 13 is a diagrammatic view of the bell circuit, Fig. 14 is an elevation of the solenoid 57 and the lever connected with the core thereof, and Fig. 15 is an enlarged plan view of the bow of the vessel showing the means whereby the parts may be operated by steam or other fluid.

It is to be understood that my improvement may be applied to either the bow, stern or sides of the vessel, or that the same may be applied to all of the said parts of the vessel, but in the embodiment of the improvement illustrated in the drawings the same is illustrated as applied to the bow of the vessel.

The vessel is indicated by the numeral 1 and may be of any desired style or construction and may be propelled by any desired means, said propelling means in the drawings, however, being in the nature of a screw or wheel operated by a fluid engine of the ordinary marine engine construction.

The stem of the vessel is indicated by the numeral 2 and its keel by the numeral 3. The keel in the present instance, may comprise or may have attached thereto a cross sectional rectangular casing. The casing or hollow keel extends from the bow to the stern of the vessel and has arranged therein a longitudinally movable bar 5, the said bar being preferably in the nature of an I-beam and having one or both of its sides formed with vertical teeth 6. The outer end of the bar is provided with an upturned member forming a nose 7, and the bar and its nose will hereinafter be referred to as the feeler member of the improvement. The feeler member is adapted to be projected a suitable distance beyond the bow of the vessel so that should its nose 7 contact with an obstruction the same will be caused to move rearwardly away from the said obstruction to within the casing or hollow keel and actuate mechanism for applying a brake in a manner which will presently be described, as well as for sounding an alarm which will also presently be described.

The stem 2 has arranged thereon a vertically disposed buffer member preferably in the nature of a flat rectangular plate 8, the said plate being projected beyond the stem through the medium of a plurality of helical springs 9 which are connected both to the stem and to the plate, and the said buffer is adapted to partially absorb any shock to which the stem of a vessel is subjected.

Arranged upon the opposite sides of the vessel 1 at the bow thereof and at an equal distance from the stem 2 are vertically disposed pairs of eyes 10. These eyes 10 are adapted to receive vertically disposed rods providing shafts 11, the said eyes forming bearings for the shafts, and the said shafts are provided with rectangular ends 12 which extend above the deck of the vessel. Secured to the shafts 11 and projecting therefrom are arms 13—13, the upper arm upon each side of the vessel being arranged between the bearing eyes 10, so that the lower bearing eyes also form supports for the said upper arms. The free ends of the arms are formed with eyes 14 which are adapted to receive pintles 15, each of said pintles passing through suitable eyes 16 formed upon the inner faces of the winged members 17—17. The eyes 16 are arranged to engage with the eyes 14 in the ends of the arms 13, so that the eyes of the wings provide contact members or bearings for the upper arms 13. The wings have their central portions provided with interengaging knuckles 18 through which passes a pivot rod 19, the lower end of the rod 19 passing through a slot 20 provided in the upper face of the feeler member, the said slot communicating with the substantially rectangular opening 21 forming a pocket to receive a head 22 formed upon the lower end of the said pivot member 19. The inner faces of the pivoted wings 17 are formed with reinforcing ribs or enlargements 23, the same contacting when the wings are brought into engagement with the sides of the vessel, filling the space between the stem and the pivoted ends of said wings, so as to prevent a water pocket being formed between the wings and the stem of the vessel. The ribs 23 are really in the nature of blocks which are cut away at suitable places in order to accommodate the arms 13, the pintles 15 and the eyes 16, and the said reinforcing members are adapted to have their inner faces contacting when the wings are folded against the sides of the vessel.

Arranged in a suitable vertically disposed bearing 23' disposed at the bow of the vessel and directly to one side of the stem 2 is a shaft 24. This shaft has its lower end provided with a toothed wheel 25, the teeth of which at all times mesh with the teeth 6 provided upon the bar or feeler member 5. The shaft 24 extends above the deck of the vessel and is provided with a beveled toothed wheel 26 that is engaged by a pinion 27 secured upon one end of a longitudinally extending shaft 28. The shaft 28 is arranged in suitable bearings 29 secured upon the deck of the vessel and has its free end provided with a clutch head 30.

The numeral 31 designates a motor, preferably an electric motor and 32 the shaft for the motor. The shaft 32 is arranged in alinement with the shaft 28, and preferably has its end disposed in a suitable opening in the end of the shaft 28, and also the shaft 32 is journaled in suitable bearings 33. Arranged for sliding movement upon the shaft 32 is a clutch head 34, the bore of the same being provided with a slot to receive a spline or finger 35 provided upon the said shaft 32, so that the clutch head will revolve with the shaft. The clutch head 34 may be operated by a lever 36, so that the said clutch head may be thrown into engagement with the clutch head 30 to revolve the shafts 32 and 28, and consequently rotate the shaft 24 to cause the toothed wheel 25 to move the bar or feeler member 5 either outwardly or inwardly with relation to the vessel, such movement, of course, taking place when the motor 31 is operated.

Secured in a bearing 37 similar to the bearing 23 but upon the opposite side of the stem 2 and also upon the opposite side of the buffer member is a second shaft or rod 38, the same being at its lower end provided with an offset finger 39 while the upper end of said rod 38 is also offset or provided with an angular member 40. The angular member 40 is adapted to be rotated to bring the finger 39 into contact with the teeth 6 upon the second side of the bar of the feeler member, so that when the feeler member is moved longitudinally it will rotate the rod 38 in its bearing 37, causing the angular member 40 to contact with suitable mechanism that will sound an alarm 41 both upon the bridge and in the engine room of the vessel, and also similar elements may be stationed at desired points throughout the vessel, the idea of the arrangement being to notify the officers and if necessary the passengers that the nose 7 of the feeler member has contacted with an obstacle and has been forced inwardly toward the stem of the vessel.

In Fig. 13 of the drawings the angular member 40 is in the nature of a contact or one of the members of an electric switch, the vessel being provided at its bow with the second contact member 42, suitable wires being connected with both the members of the switch provided by the elements 40 and 42, and the said wires receive their energy from the dynamo providing the lighting system for the vessel. The rectangular ends 12 of the shafts 11 may be provided with suitable angular members or handles 43 which have flexible connections 44 that are wound around suitable drums 45 and 46 carried by a shaft 47 arranged transversely of the vessel upon the deck thereof. The shaft is centrally mounted in spaced bearings 48 and has keyed thereto a toothed wheel 49 which is arranged between the said bearings 48, and the said toothed wheel meshes with a gear 50 provided upon the shaft 51 of a motor 52. An electric wiring runs also to the motor 52 so that when the switch members contact with each other the motor 52 will be energized and revolve the shaft 47, and will, through the flexible members 44, swing the handles 43 causing the shafts 11 to rotate to swing the wings to their open position, as illustrated in Figs. 2 and 4 of the drawings. The central portion of the wings will contact with the buffer provided by the plate 8 in the springs 9 and the connection between the shafts 11 and the wings will sustain the said wings laterally of the stem of the vessel, thus stopping or halting the movement of the vessel in either direction, and as stated, alarm the engineer so that he may halt and reverse the engines. If desired, and as illustrated in Fig. 14 the wiring may include means for automatically halting the engine, and in the said figure the reversing lever is indicated by the numeral 53 which is provided with a removable sleeve or collar 54 provided with a pivoted link 55 which is likewise pivoted to the core 56 of a solenoid 57. The solenoid 57 is, of course, wired to the electric system, and when the current is applied the core will be drawn in the solenoid so that the lever 53 will be swung automatically. As stated, the sleeve 54 is removably connected with the reversing lever and need only be applied when the engineer or his assistants have reason for leaving the engine room or when the vessel is in the vicinity of icebergs or other obstacles.

In order to prevent the rotation of the shafts 11 in a reverse direction, that is in order to hold the said shafts steadily while the wings are spread to braking position, each of said shafts may be provided with a ratchet wheel 58, a spring pressed pawl or dog 59 co-acting with each of the said ratchets, and, of course, the said dogs must be thrown out of engagement with the ratchets and the handles operated to again swing the wings against the sides of the vessel when the vessel is to proceed on its voyage.

If desired, the wings may be operated by fluid power, such an arrangement being illustrated in Fig. 15 of the drawings. With such an arrangement the arms or handles 43 are each connected with a piston rod 60, each of said piston rods being disposed in reversely arranged steam cylinders 61 and 62, the piston heads 63 and 64 respectively working in opposite directions. Steam is allowed within the cylinders 61 and 62 by a suitable pipe 65 leading from the boiler in the engine room, the said pipe being provided with branches 66 and 67, each of which communicates with the respective cylinder 61 and 62. The pipe 65 is provided with a valve 68, and the angular member 40 of the rod 38 has a connection 69 with the stem of the said valve 68 and so when the rod 38 is actuated by its finger 39 engaging with the teeth 6 upon one side of the bar 5, steam will be permitted to enter the cylinders 61 and 62, forcing the piston heads 63 and 64 in opposite directions, causing the piston rods 60 to move the handles 43 in opposite directions, and so swing the wings outwardly to a braking position.

In order to retain the feeler member against movement from the pressure of the water the shaft 24 may be provided with a ratchet wheel 70 which is engaged by a spring pressed dog 71, the engagement between the dog and the ratchet being sufficient to prevent the rotation of the shaft under all normal conditions but when an excessive pressure is applied to the nose of the feeler member, said dog will be forced out of engagement with the ratchet to within its casing, and a greatly excessive pressure will break the said engaging end of the dog.

In the showing of the drawing the wings and the projecting feeler member as well as the mechanism for operating the parts will, of course, add weight to the bow of the vessel, and to compensate for this the keel at the stern of the vessel may be weighted, and likewise weights may be arranged within the hold of the vessel at the stern thereof; but I have found that such arrangement is not only awkward but must be arranged with great accuracy to prevent the stern of the vessel sinking below its normal water line. Therefore, I provide the keel adjacent the stern of the vessel with auxiliary wings 72 and 73 respectively, each of which being preferably hingedly connected to the opposite sides of the hollow keel, as at 74 and 75 respectively. These auxiliary wings have their inner faces provided each with a pair of pivoted links 76 and 77 respectively which are in turn pivotally connected, as at 78, to the opposite sides of the longitudinal bar 5 of the feeler member, the said links passing through suitable slots provided in the hollow keel. By this arrangement it will be noted that when the feeler member is projected the auxiliary wings will be folded against the sides of the vessel, but when the said member is pressed toward the bow of the vessel, the wings will be spread outwardly, offering a resistance to the water and compensating for the additional weight at the bow of the vessel.

From the above description, taken in connection with the accompanying drawings, the advantages and operation of the device will, it is thought, be apparent to those skilled in the art to which such inventions appertain. Other embodiments will, of course, suggest themselves to those familiar with the art, but it is believed that the embodiments herein will exemplify the uses and advantages of the improvements claimed.

Having thus described the invention, what I claim is:

1. A marine vessel having a hollow keel extending the entire length of the vessel, an I-beam arranged within the keel, said beam having its outer end upturned to provide a nose, and the opposite sides of the said beam being formed with teeth, a shaft arranged in bearings in the stem of the vessel and having its lower end provided with a toothed wheel co-acting with the teeth upon one of the sides of the I-beam, means for operating in the shaft to project the I-beam, a rod mounted in bearings and having its lower end provided with a finger which engages with the teeth upon the opposite side of the I-beam, said rod having its upper end offset, an audible alarm, means between the offset end of the rod and the alarm for sounding the latter when the finger rod is swung by a movement of the I-beam toward the vessel.

2. In a marine vessel, shafts journaled in bearings upon the opposite sides of the bow of the vessel, arms secured to the shafts, wing members pivotally connected with the arms, said wing members having their outer ends hingedly connected, a buffer plate upon the stem of the vessel disposed centrally of the wings, reinforcing members for the wings filling the space between the bow of the vessel and the said wings, and means for actuating the shafts to swing the said wings laterally of the stem of the vessel.

3. A marine vessel having a longitudinally adjustable feeler member upon its keel, shafts journaled in bearings upon the opposite sides of the bow of the vessel, arms connected with the shafts, wings pivotally secured to the arms, said wings having their outer ends provided with knuckles, a pintle passing through the knuckles and entering a longitudinal groove in the upper face of the feeler member, a buffer upon the bow of the vessel, and means actuated by the feeler member when moved toward the vessel for operating the shafts to swing the wings laterally of the stem of the vessel.

4. A marine vessel having a hollow keel, a feeler member having its end provided with a nose and its body arranged within the hollow keel, means, including mechanism for moving the feeler member to project its nose beyond the stem of the vessel, said stem of the vessel being provided with a buffer member, means for retaining the feeler member in its adjusted position, shafts upon the opposite sides of the bow, arms connected with the shafts, wings connected with the arms, said wings having their outer ends hingedly connected and means including mechanism actuated by the feeler member when moved toward the vessel for spreading the wings laterally of the stem of the vessel to bring their hinged ends into contact with the buffer member.

5. A marine vessel having its stem provided with a buffer, a hollow keel, an elongated beam arranged within the keel and having its end formed with a nose, said beam having its opposite sides toothed, the shaft upon the stem having its lower end formed with a toothed wheel which co-acts with the teeth upon one side of the beam, a rod journaled upon the opposite side of the stem and having its lower end provided with a finger which co-acts with the teeth upon the second side of the beam, said rod having its upper end provided with an angular member, shafts journaled upon the opposite sides of the bow of the vessel, arms connected with the shafts, wings connected with the arms, said wings having their ends pivoted on a pivot pin arranged within a longitudinal groove in the beam, means for retaining the said pin within the groove, arms upon the shafts, means upon the deck of the vessel for actuating the arms to swing the shaft and spread the wings laterally of the vessel, a connection between the angular member of the rod and the said operating means normally retained in inoperative position and adapted to be moved to operative position when the rod is rotated by the contact of its finger with the teeth of the beam when the said beam is moved toward the vessel.

6. In a marine vessel, shafts journaled to the opposite sides of the bow thereof, arms connected with the shafts, wing members having their outer ends hingedly connected and pivotally secured to the arms, and a normally projected feeler member having means co-acting with the shafts for rotating the same to swing the arms to spread the wings when the said feeler member is moved in the direction of the vessel and to fold the wings against the vessel when the feeler is moved in a direction away from the vessel.

In testimony whereof I affix my signature in presence of two witnesses.

VITO GRECO.

Witnesses:
L. E. PARK,
FRED S. PALERMO.

Copies of this patent may be obtained for five cents each, by addressing the "Commissioner of Patents, Washington, D. C."